(12) United States Patent
Lamoine et al.

(10) Patent No.: US 7,052,267 B2
(45) Date of Patent: May 30, 2006

(54) EXTRUSION DEVICE FOR MANUFACTURING A PRODUCT BASED ON A RUBBER MIX

(75) Inventors: Philippe Lamoine, Clermont-Ferrand (FR); Gérard Crosnier, Ceyrat (FR); Serge Nicolas, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 384 days.

(21) Appl. No.: 10/444,490

(22) Filed: May 23, 2003

(65) Prior Publication Data

US 2004/0009255 A1    Jan. 15, 2004

Related U.S. Application Data

(63) Continuation of application No. PCT/EP01/13644, filed on Nov. 23, 2001.

(51) Int. Cl.
*B29C 47/16* (2006.01)

(52) U.S. Cl. ...................... 425/382.3; 425/365
(58) Field of Classification Search ............. 425/365, 425/382.3, 133.1, 133.5
See application file for complete search history.

(56) References Cited

U.S. PATENT DOCUMENTS

| | | | | |
|---|---|---|---|---|
| 1,920,445 A | * | 8/1933 | Thurlings | .................. 425/235 |
| 2,297,244 A | * | 9/1942 | Pfahl | ........................ 44/634 |
| 4,028,031 A | | 6/1977 | Seide | ........................ 425/147 |
| 4,304,539 A | | 12/1981 | Hagiwara et al. | ........... 425/145 |
| 4,744,745 A | | 5/1988 | Harada et al. | .............. 425/466 |
| 5,017,118 A | | 5/1991 | Looman et al. | .......... 425/133.5 |

FOREIGN PATENT DOCUMENTS

| | | |
|---|---|---|
| DE | 4105484 | 8/1992 |
| FR | 2 294 039 | 7/1976 |
| JP | 58148017 | 9/1983 |
| JP | 01247133 | 10/1989 |

* cited by examiner

*Primary Examiner*—Joseph S. Del Sole
(74) *Attorney, Agent, or Firm*—Buchanan Ingersoll PC

(57) ABSTRACT

An extrusion device (1) for manufacturing a product based on a rubber mix, which comprises a rotary roller (5), an inlet orifice (15) for the rubber mix and a vault (6) partially circumferentially covering the external surface (51) of the roller (5), the rubber mix being driven from the inlet orifice (15) into the air gap situated between the vault (6) and the roller (5) towards an extrusion orifice (21) defining the profile of the product. The extrusion orifice is delimited by a wall (20) which cooperates with the external surface (51) of the roller (5), and the vault (6) carries on its internal surface oriented towards the roller projecting threads in order to delimit with the surface (51) of the roller a chamber for plasticization of the mix, at least two of the threads extending substantially axially of the roller.

21 Claims, 6 Drawing Sheets

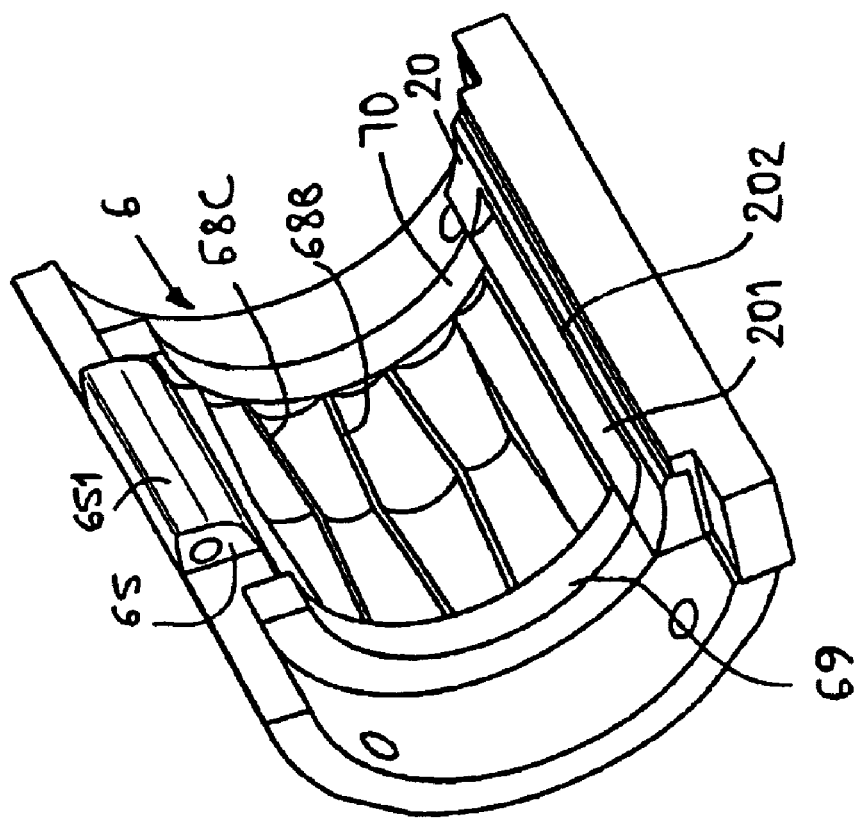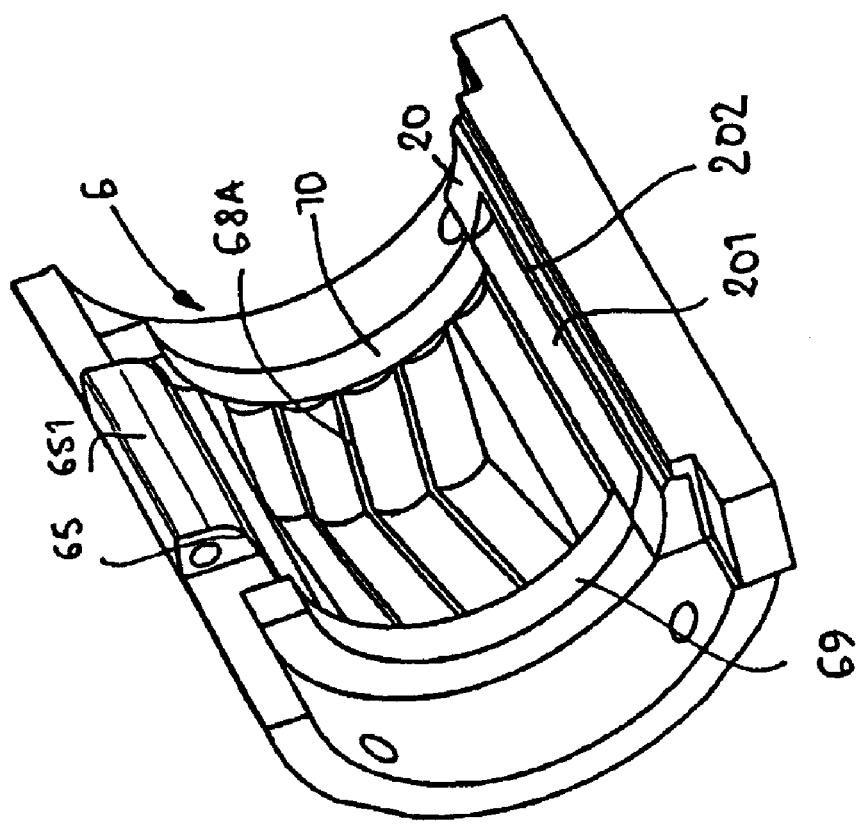

EXTRUSION DEVICE FOR MANUFACTURING A PRODUCT BASED ON A RUBBER MIX

CROSS REFERENCE TO RELATED APPLICATIONS

This is a continuation of international application PCT/EP01/13644 filed Nov. 23, 2001, which was published in French on May 30, 2002 as international publication WO 02/42053 A2 and which claims priority of French application 00/15460 filed Nov. 27, 2000.

BACKGROUND OF THE INVENTION

1. The Field of Invention

The invention concerns an extrusion device for manufacturing a product based on a rubber mix in the form of a thin strip. The invention more particularly concerns a device for producing a profiled product based on a rubber mix in the form of a very thin strip which can be very wide and can be directly deposited on a form or drum or directly superimposed on another material at the discharge from the device.

2. The Related Art

In the field of manufacturing tire covers, semi-finished products are produced consisting of mixes of rubber which are then connected to each other. According to the temperature of the products and the nature of the rubber mixes which make up the products, difficulties are frequently encountered in making one product adhere to the other during the manufacture of the tire. The solution to this problem used for a long time by manufacturers consisted of applying a rubber solution dissolved in an organic solvent to one of the products. Now, for reasons of environmental protection, it is sought to eliminate the use of such solvents. It is therefore necessary to have recourse to new solutions.

One solution consists of depositing between the two products to be "stuck" together a very fine layer of rubber products having a very high adhesive power, which is often referred to as a "connecting compound". Such a connecting compound has been used for a long time in the field of retreading to effect the connection between the cured carcass and a new tread.

In order to be able to place such a layer directly at the discharge from the extruder, notably in order to conserve its temperature, its stickiness and other characteristics of the connecting compound, and also from an industrial point of view, it is particularly advantageous to directly manufacture a very thin strip that is coextensive in width with the element to be covered. Thus, for example, for manufacturing a tire to be retreaded, it is desirable to produce a strip with a width identical to that of the cured tire carcass and having a thickness of around a few tenths of a millimeter.

In addition, it is desirable to make tire covers in a fashion which is ever more precise. Such precision in manufacture depends notably on complying with the dimensions of the rubber products, in particular the precision and constancy of thickness and the width of the products, that are assembled to make up the tire cover.

Different categories of apparatus are already known for effecting rubber extrusions. The extruders, which conventionally have one or more extrusion screws opening out onto an accumulation chamber and driving the rubber mix as far as an extrusion orifice, are divided into two categories:

- extruders normally referred to as "roller die extruders", which are characterized by an extrusion plate consisting of the external surface of a roller which cooperates with a fixed wall, and
- so-called "flat die extruders", characterized by an extrusion plate consisting of fixed walls.

These extruders make it possible to extrude, in great length, a product whose profile is substantially constant with different advantages for each category of extruder. Whatever the category, the width of the extruded strip obtained is limited with respect to the diameter of the extrusion screw or the distance between the centers of the extrusion screws if it is an extruder having multiple extrusion screws. This is because, if the width of the product and, therefore, the width of the extrusion orifice is very great compared with this diameter or distance, there will be supply problems in bringing sufficient mix with a correct delivery rate as far as the plate and also difficulties in retaining the mix in the plate, as well as difficulties in distributing the mix, pressures and delivery rates over the entire width of the extrusion orifice.

These different items of equipment, therefore, make it possible to obtain products of limited width. This width is all the more limited because, for industrial reasons of having machines which are compact, it is sought to limit the size of the extrusion screw or screws.

In order to remedy these problems, French patent document No. 2,294,039 (U.S. Pat. No. 4,028,031) describes an extruder associated with a calender for producing a wide thin strip of product based on rubber mix. The extruder has an extrusion screw which drives the rubber mix into an accumulation chamber, at the discharge of which there are disposed two rollers whose axes are perpendicular to the axis of the extrusion screw and in the gap between which the strip is "profiled".

Such a device poses, for a broad strip, not insignificant technical difficulties which can have an effect on the quality of the product. This is because the size of the extrusion orifice is very far away from the final width of the product, which causes a problem in driving the rubber compound and irregular distribution over a much wider surface, in the same way as what was explained above for an extrusion plate with a size very much greater than the diameter of the extrusion screw. It also gives rise to risks of having a production width which is not constant.

In addition, such a device is very bulky since it requires considerable lateral space in the direction of the width of the strip to make it possible to obtain such a width, and an axial dimension, in the direction of the extrusion screw, which is also great.

The invention aims to mitigate these drawbacks.

Hereinafter, "axial", "radial" and "circumferential" will designate the directions parallel respectively to the axial, radial and circumferential directions with respect to the roller of the extrusion device.

SUMMARY OF THE INVENTION

According to the invention, the extrusion device for manufacturing a product based on a rubber mix comprises a rotating roller, an inlet orifice for the rubber mix, and a vault partially circumferentially covering the surface of the roller, the rubber mix being driven from the inlet orifice into the gap situated between the vault and the roller towards an extrusion orifice defining the profile of the product. The extrusion orifice is delimited by a wall which cooperates with the external surface of the roller. The vault carries on its internal surface oriented towards the roller projecting threads in order to delimit with the surface of the roller a chamber for plasticizing the mix, at least two of the threads extending substantially axially of the roller.

The extrusion orifice thus extends in the axial direction, i.e., the direction of the axis of the roller, which effects with the vault an effective plasticizing work on the compound, which makes it possible to obtain a wide strip with a limited size of the device corresponding to the axial length of the roller. Naturally, obtaining with the device a strip with a lesser width, or even a tiny strip, is not excluded.

Advantageously, the two threads extending substantially axially consist of the threads situated closest to the extrusion orifice, which makes it possible to ensure the direction and distribution of the mix towards the extrusion orifice.

Provision can also be made for the area of the vault forming the plasticization chamber to be delimited by two edges for receiving leakages of rubber mix. This makes it possible to control the width of the extruded product. Such leakage reception systems can be equipped with conventional sealing devices (joints, etc).

According to a variant embodiment of the invention, the area of the vault forming the plasticization chamber is divided into sectors, with two consecutive sectors being separated by projecting threads parallel to each other, extending substantially axially.

According to another variant, the area of the vault forming the plasticization chamber has helical threads or helical threads having on the same thread a left-hand thread and then a right-hand thread or vice-versa. Different forms of thread can in fact be chosen so as to obtain a different working on the rubber mix, this choice depending notably on the nature of the rubber mix.

Advantageously, the wall cooperating with external surface of the roller consists of a fixed plate which carries an alveolus extending substantially axially and separated from the last sector of the vault in the closed position of the device by a thread extending substantially axially and carried by the vault, the alveolus of the plate having an axial length greater than that of the thread. The creation of this divergence at the end of the travel of the rubber mix enables the mix to be distributed over the whole of the length of the alveolus, thereby guaranteeing constancy of thickness and width of the profiled product without causing burrs while recovering any lateral leakages.

BRIEF DESCRIPTION OF THE DRAWINGS

Other characteristics and advantages of the invention will emerge from the following description of an exemplary embodiment of an extrusion device according to the invention, with reference to the accompanying drawing, in which:

FIG. 7 is a schematic perspective representation of a variant embodiment of the vault threads of the embodiment depicted in FIG. 2;

FIG. 8 is a schematic perspective representation of another variant embodiment of the vault threads of the embodiment depicted in FIG. 2.

DETAILED DESCRIPTION OF EXEMPLARY EMBODIMENTS

Figure 1:
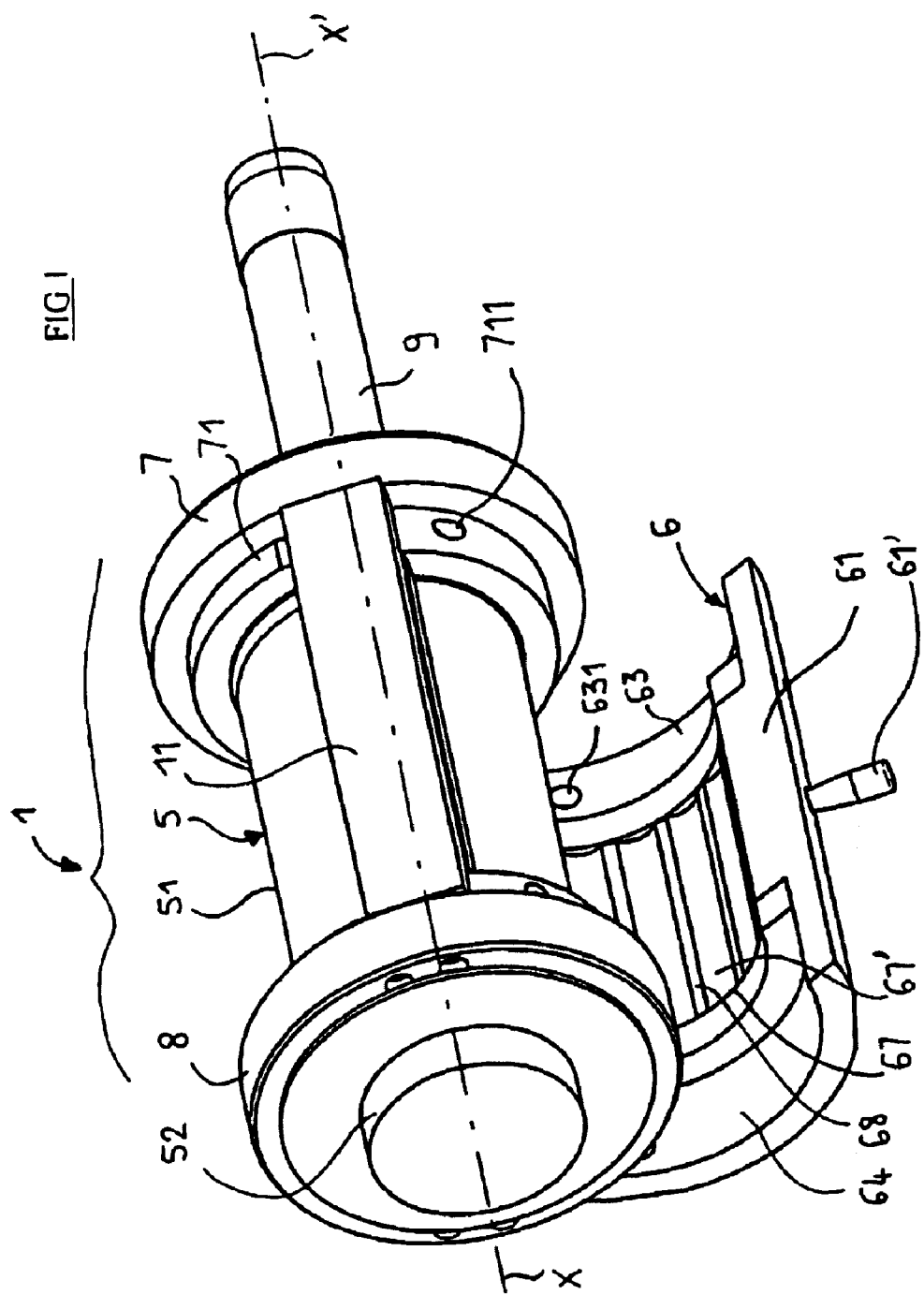
FIG. 1 is a partial schematic perspective of one embodiment of the device according to the invention, with a vault in the open position.

Hereinafter, the identical components in the various variant embodiments of the invention depicted in the figures are given the same reference numbers.

According to FIGS. 1–4, the extrusion device 1 comprises a roller 5 rotating about its axis XX' and having an external surface 51 and a vault 6 which delimits with the surface 51 a chamber for plasticizing a rubber mix and circumferentially partially covers the roller 5. At the respective circumferential ends 61 and 62 of the vault 6, there are situated an inlet orifice 15 for the rubber mix and an extrusion orifice 21 for the profiled product, the rubber mix being driven from the inlet orifice 15, into the gap situated between the vault 6 and the roller 5 and towards the extrusion orifice 21.

Figure 3:
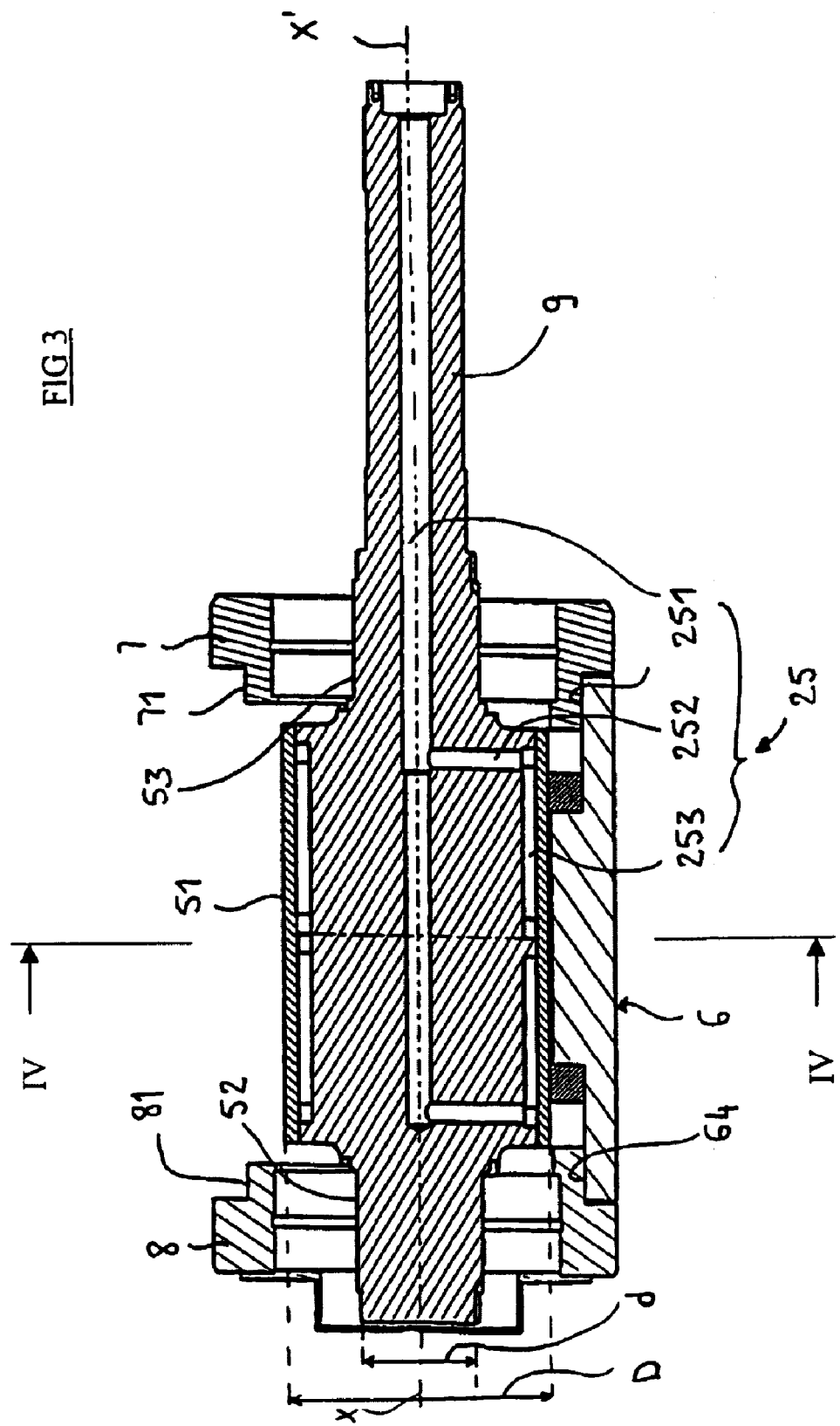
FIG. 3 is an axial sectional view of the embodiment depicted in FIG. 1.

The roller 5 is mounted on a shaft 9 with which it is integral with respect to rotation. As shown in FIGS. 1 and 3, the shaft 9 and the roller 5 are formed in one piece, but it can be envisaged that these could be two distinct pieces. The roller 5 thus has two cylindrical shoulders 52 and 53 of diameter d (corresponding to the diameter of the shaft 9). The external surface 51 of the roller 5 corresponds to the zone of the roller 5 having a diameter D greater than d.

On the two shoulders 52 and 53 there are mounted, by means of bearings (not shown), two annular flanges respectively 7 and 8. Each flange 7, 8 carries axially internally with respect to the center of the roller 5 a cylindrical shoulder 71, 81 which cooperates respectively with a shoulder carried by each of the two axial ends 63 and 64 of the vault 6 to enable the latter to be fixed to the device.

The shoulder 71 on the cooperating flange 7 on the end 63 are fixed together by means of screws (not shown) using the passage holes 711 through the shoulder 71 of the flange 7 and the passage holes 631 in the end 63, and the same applies to the fixing of the shoulder 81 and of the shoulder carried by the end 64 of the vault 6.

It is clear that the connection between the shoulders 71, 81 and the shoulders 63, 64, respectively, could be effected by any other means.

Figure 4:
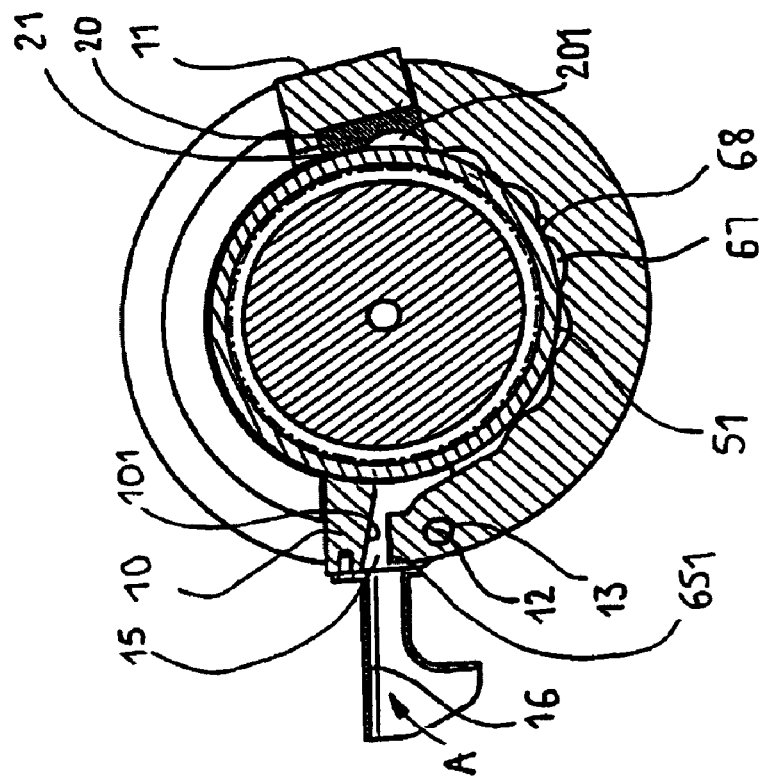
FIG. 4 is a radial section of the embodiment depicted in FIG. 3 along the line IV—IV.

As can be seen in FIGS. 1 and 4, two axially-extending support elements 10 and 11 are mounted between the flange 7 and the flange 8, the two elements being offset circumferentially with respect to the roller 5. The elements 10 and 11 are fixed rigidly to the flanges 7 and 8 by any appropriate means such as screws or by effecting a single-piece manufacture of these elements 10, 11, 7 and 8.

Figure 2:
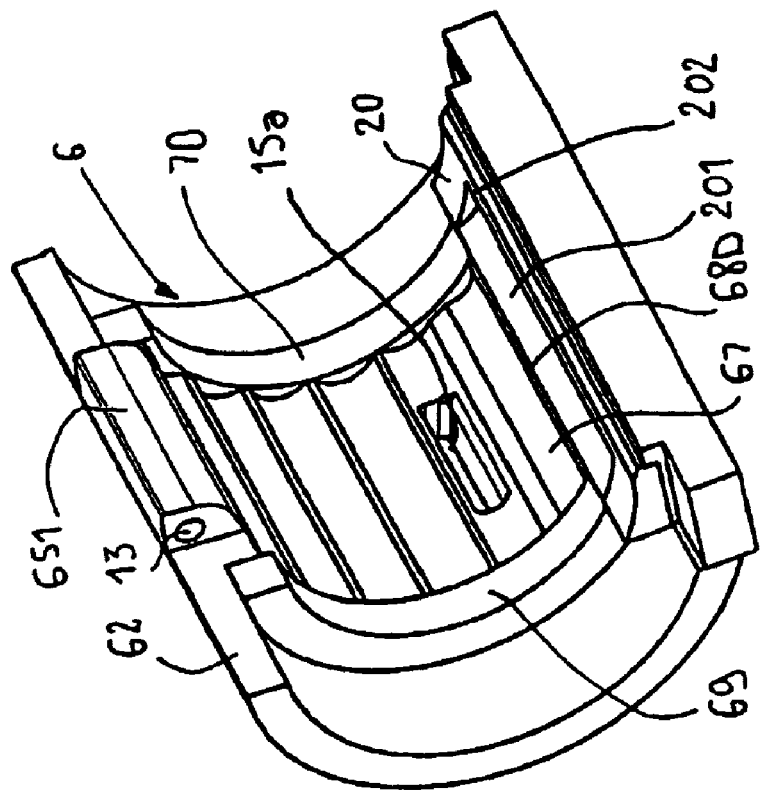
FIG. 2 is a schematic perspective of certain elements (plate and vault) of the device depicted in FIG. 1 in the closed position.

The circumferential end 62 of the vault 6 adjacent the inlet orifice 15 is pivotally mounted on the support element 10 about a rod 12 carried by the support 10 element which cooperates with a passage hole 13 in a rim 65 carried by the vault 6, as shown in FIGS. 2 and 4.

The external wall 651 of the rim 65 forms together with an opposed wall 101 carried by the support element 10 the inlet orifice 15 for the rubber mix. The inlet orifice 15 opens out in contact with the surface 51 of the roller 5. In order to keep access to the inlet orifice 15 away from the roller 5, for reasons essentially of safety, the presence of an access channel 16 can be provided, opening out onto the inlet orifice 15.

The support element 11 cooperates with the opposite circumferential end 61 of the vault 6 to allow fixing of this end, for example by screws, and the closure of the device. Advantageously, the fixing can be removable, so as, as illustrated in FIG. 1, to be able to allow the vault 6 to pivot around the axis 12 using a handle 61 and to have access to the roller 5, notably for cleaning the device.

In addition, as shown more particularly in FIGS. 2 and 4, an extrusion plate 20 is mounted internally on the support element 11 so that the extrusion plate 20 delimits, with the surface 51 of the roller 5, an orifice 21 for extruding the profiled product. It could also be envisaged having, instead of a plate, a movable wall consisting, for example, of the external surface of another roller. The extrusion orifice 21 is aligned with an outlet of the plasticization chamber in a direction oriented generally tangentially relative to the roller's external surface, as can be seen in FIG. 4. When the vault is pivoted about the axis 12, it will pivot relative to the extrusion orifice which remains fixed (see FIG. 1).

The roller 5 carries, in a manner known per se, a cooling device 25 (FIG. 3) consisting of a feed channel 251 which passes through one of the ends of the roller 5 in order, in the central area of the latter, to distribute its flow in two radial channels 252 supplying a cooling fluid circulation "system" 253 passing under the surface 51 of the roller 5. This end of the roller 5 is motorized in order to allow its axial rotation and mounted on a frame which will not be detailed here, the invention not relating to the latter.

Hereinafter the vault 6 will be described in more detail in order to understand the functioning of the device according to the invention.

As shown in FIG. 2, the central area of the vault 6 has a central area or zone 65 divided into radial sectors 67 each having a concave surface 67', two consecutive sectors 67 being separated by a thread 68. The ratio between the thickness of the strip of product emerging and the passage between the threads 68 and the surface 51 of the roller 5 is at least greater than 1 and is a function of the mean thickness of the product, so that this passage is not a limitation on the return throughput. The thread-carrying portion of the vault's internal surface only partially circumscribes the roller's external surface and extends circumferentially no farther than the location of the extrusion orifice 21, as can be seen in FIG. 4.

Sectors 67 have been shown here with identical sizes and radii of curvature. It is possible without departing from the scope of the invention, to envisage sectors with different or variable sizes and/or radii of curvature.

It is also possible to envisage that the vault 6 not be divided into sectors, but it is necessary that they have at least two threads extending substantially axially so as to guide the mix towards the extrusion orifice 21 while distributing it over the width of the orifice 21. Other threads on the vault can be oriented in different directions, such as helical threads or threads which are convergent or divergent with respect to the axial threads and such as helical threads having a right-hand thread and then a left-hand thread on the same thread or vice-versa as depicted in FIGS. 7 and 8. Thus, FIG. 7 has threads 68A which diverge in the direction of the axial threads, while FIG. 8 shows divergent threads 68B which follow on from threads 68C that are convergent towards the axial threads.

The sectors 67 are delimited axially by two edges 69 and 70 receiving leakages of rubber mix, as will be seen during the functioning of the device.

The last sector 67 of the vault is separated from the extrusion plate 20 by a thread 68D, the extrusion plate itself carrying an alveolus 201 which is longer axially than the sectors 67 of the vault in order to create a divergence which will determine, through the edges of the alveolus 201, the outlet width of the profiled product. In addition, provision is also made for the alveolus 201 to be deeper than the sectors 67 of the vault 6 in order to constitute a reserve of rubber mix for ensuring continuity in the supply of mix to the extrusion orifice 21.

The plate 20 also carries a thread 202 which follows the alveolus 201 in the direction of rotation of the roller 5, the thread 202 defining the profile of the rubber mix-based product obtained, the spacing between the surface of the thread 202 and the surface of the roller 5 thus delimiting the thickness of the emerging profile.

It is therefore possible to adjust the spacing between the plate 20 and the external surface 51 of the roller 5 and, therefore, to define the height of the extrusion orifice 21 according to the profile of the strip of rubber product to be obtained.

This device is preferentially used for producing a strip with a thickness of less than 5 mm since the work of plasticizing the rubber mix effected by the device is necessarily limited by the nature of the tooling. However, it can also be envisaged producing a thicker strip according to the nature of the rubber mix and the shape in which it is introduced into the inlet orifice of such a device, for example by using a mix which has already been worked prior to its introduction.

Additional members for increasing the working of the mix, such as fingers, can also be provided.

More particularly, the device makes it possible to achieve strips with a thickness of less than 0.5 mm and, therefore, to obtain very thin strips which can be directly placed on a form, production drum or carcass, and also to produce a doubling of product by superimposing the strip obtained on another material emerging from the extrusion orifice of the device. Thus, by virtue of the device according to the invention, it is also possible to produce strips with a thickness of less than 0.3 mm.

This device also offers a very broad field of possible use by combining several devices, making it possible, for example, to dispose two devices according to the invention opposite each other so that the profiled product issuing from one of the devices is doubled with the other product directly emerging from the respective extrusion orifices in order to produce a product normally referred to as a "complex".

It is also possible to dispose several devices according to the invention successively in the direction of rotation of a drum or, more generally, of the rotary surface, to allow the successive deposition of several products on the drum.

In addition, it is also possible to include this device in the extrusion head of a roller die extruder, the inlet orifice of the device being disposed at the end of at least one extrusion screw carried by the extruder, in order to improve the regulation of the cross section of the extrudate and the homogenization of the work.

In the example presented here, the inlet orifice 15 and the extrusion orifice 21 are diametrically opposed with respect to the roller, which has the advantage of releasing approximately 180° of the circumference of the surface 51 of the roller 5 in order to be able to deposit the extrudate with a minimum of mechanical stress on a chosen support (roller, drum, carcass, insert etc). Naturally, according to the extent of the plasticization that it is desired to obtain or according to the mix, it is possible to provide more or fewer sectors and, therefore, a circumferentially longer or shorter vault.

Hereinafter, the functioning of the device described in the above example will be described succinctly with reference particularly to FIGS. 2 and 4.

The inlet orifice 15 is fed with a rubber mix A which is introduced into the access channel 16 either in the form of a continuous strip or in the form of sheets in an identical fashion to the feed generally effected for a conventional extruder.

The rubber mix A is driven from the inlet orifice 15 into the plasticization chamber delimited by the vault 6 and the surface 51 of the roller 5 which drives the mix A in its rotation, passing through the various sectors 67 and threads 68 of the vault 6.

As the rubber mix undergoes a rise in temperature which occurs during the working of the mix, an overflow can result which expands over the reception edges 69 and 70. Such leakages circulate on the reception edges 69 and 70 while always being driven by the rotation of the roller 5.

The mix A is thus driven as far as the plate 20 and, more exactly, as far as the alveolus 201, where the mix is distributed over the entire axial length of the alveolus 201. Any leakages carried by the reception edges 69, 70 are also poured into the alveolus 201. The axial length of the alveolus 201 thus determines the width of the profiled product. The product leaves through the extrusion orifice formed by the surface 51 of the roller 5 and the thread 202 of the plate 20, with its thickness being defined by the space between the thread 202 and the roller 5.

In this way, there is obtained a profiled product with a constant width which can be both very wide and very thin.

Naturally, it is also possible to envisage a plate or a wall 20 having no alveolus of greater length than the central zone 65 of the vault 6. In this case, it may be advantageous to associate with the device a system of blades providing the width determination of the extrudate. The flash can, if necessary, be recycled.

A few examples of use of an extrusion device according to the invention will be given below. Naturally, these examples do not limit the scope of the invention solely to these applications.

Figure 5:
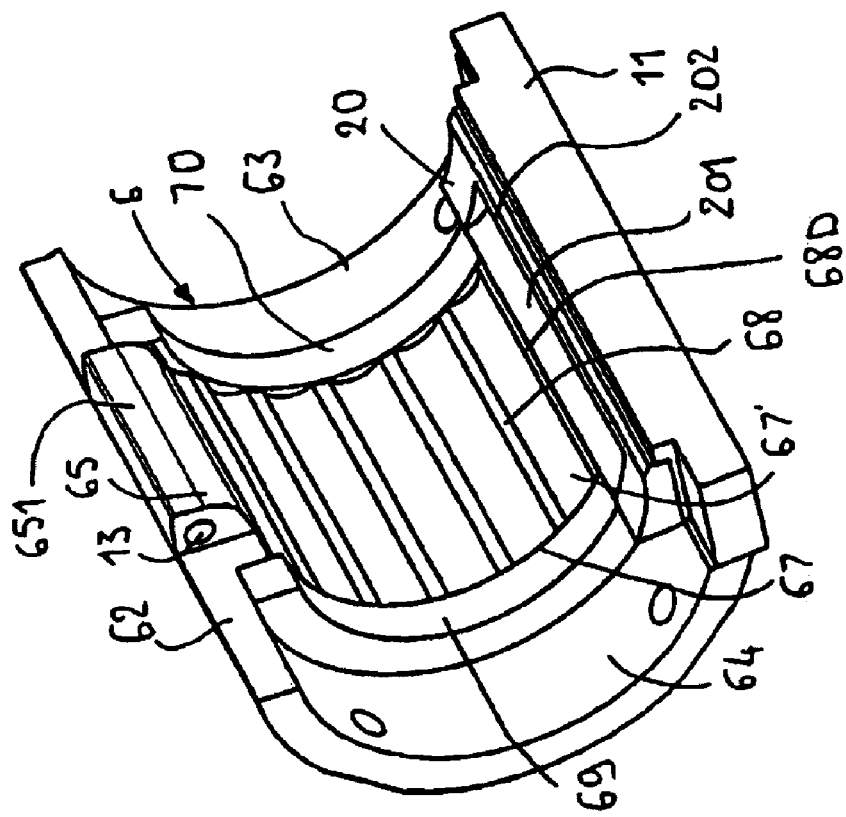
FIG. 5 is a perspective representation similar to that of FIG. 2 according to a variant embodiment of the invention.

According to a variant embodiment of the invention depicted in FIG. 5, the device has a second inlet orifice 15a for a rubber mix identical to or different from the first located inside the plasticization chamber. This device can, for example, make it possible to effect a coextrusion.

Figure 6:
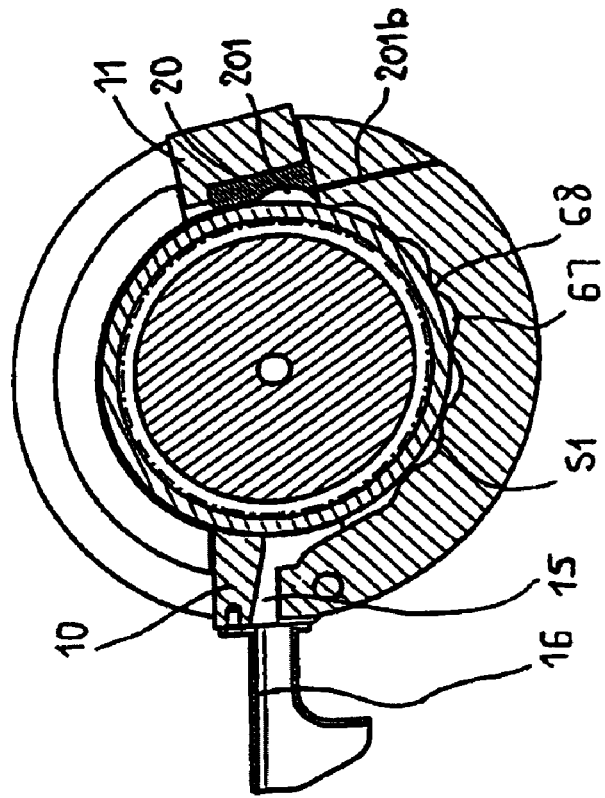
FIG. 6 is a radial section similar to FIG. 4 according to another variant embodiment of the invention.

According to another variant embodiment of the invention depicted in FIG. 6, it is possible to provide for the presence of orifices for the passage of textile or metallic threads 201b inside the alveolus 201 of the plate 20 in order to produce a ply which can be directly placed on a form or a drum.

Without departing from the scope of the invention, it can be envisaged mounting the device according to the invention on the extrusion die of an extruder so that the inlet orifice 15 of the device is disposed at the end of at least one extrusion screw carried by the extruder.

It can also be envisaged using several devices in an appliance for extruding several rubber mixes, so that at least two devices are disposed successively in the direction of rotation of a drum to allow the successive depositing on the drum of several products consecutively. On the other hand, two devices can be disposed facing each other, so that the profiled product issuing from one of the devices is doubled with the other product directly at the discharge from the respective extrusion orifices.

Figure 9:
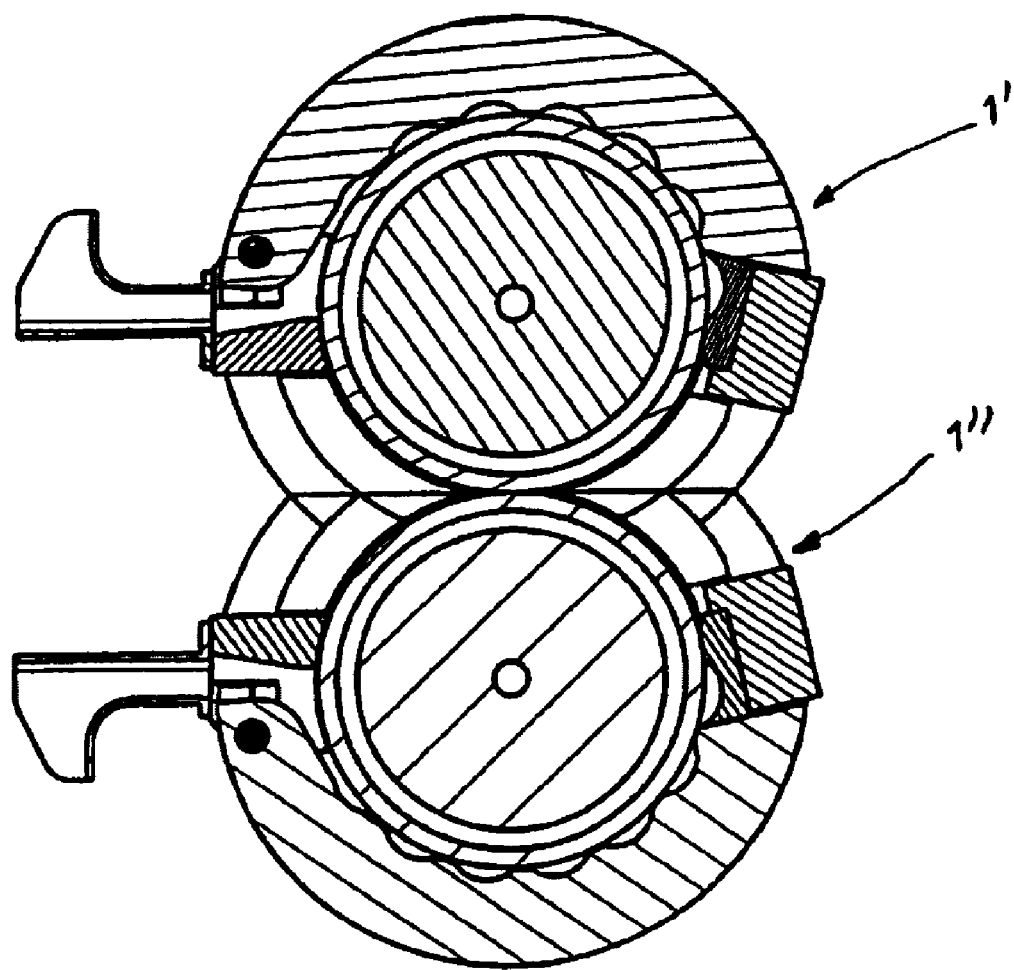
FIG. 9 is a schematic radial section of an application of an embodiment of the device according to the invention.

FIG. 9 depicts another use which combines two devices 1' and 1" according to the invention for producing a profiled product doubled by means of the profiled product issuing from each device. It is thus possible to envisage that this double profiled product is taken up by a roller at the discharge from the two devices.

The use of the device at the discharge from an extrusion appliance having a calender can also be envisaged.

These examples of appliances using one or more devices according to the invention do not limit the scope of the invention and, therefore, do not reduce the use of such devices to these examples alone.

What is claimed is:

1. An extrusion device for manufacturing a product based on a rubber mix, comprising:
   a drivable rotary roller having an external surface and an axis of rotation;
   a vault partially circumferentially covering the external surface of the roller and having an internal surface facing the external surface of the roller and forming an air gap therebetween, the internal surface of the vault carrying a plurality of projecting threads which delimit with the external surface of the roller a zone forming a chamber for plasticization of the rubber mix, at least two of the threads extending axially of the roller;
   an inlet orifice for introducing the rubber mix into the air gap between the roller and the vault; and
   an extrusion orifice spaced circumferentially from the inlet orifice, the extrusion orifice defining the profile of the product, the extrusion orifice formed by and between the roller's external surface and a wall facing the roller's external surface;
   the internal surface of the vault only partially circumscribing the external surface of the roller and not extending circumferentially past the extrusion orifice.

2. A device according to claim 1, comprising more than two threads and in which the at least two threads extending substantially axially are situated closer to the extrusion orifice than the remaining threads.

3. A device according to claim 1, in which the zone of the vault forming the plasticization chamber is delimited axially by two reception edges for rubber mix leakages.

4. A device according to claim 1, in which the zone of the vault forming the plasticization chamber is divided into a plurality of sectors, circumferentially adjacent sectors being separated by projecting threads parallel to each other and to the at least two threads extending substantially axially.

5. A device according to claim 1, in which the zone of the vault forming the plasticization chamber includes helical threads.

6. A device according to claim 5, in which the helical threads have a left-hand thread and a right-hand thread on the same thread.

7. A device according to claim 1, in which the wall consists of a fixed plate.

8. A device according to claim 1, in which the wall forming the extrusion orifice comprises a fixed plate including an alveolus extending substantially axially and separated from the vault by a substantially axially extending thread carried by the vault, the alveolus of the plate having an axial length greater than that of the thread.

9. A device according to claim 8, in which the zone of the vault forming the plasticization chamber is divided into a plurality of sectors having concave surfaces of a given depth, and the depth of the alveolus in the plate is greater than the depth of the sectors of the vault.

10. A device according to claim 1, in which the spacing between the wall and the external surface of the roller defining the height of the extrusion orifice is less than 5 mm.

11. A device according to claim 10, in which the height of the extrusion orifice is less than 0.5 mm.

12. A device according to claim 11, in which the height of the extrusion orifice is less than 0.3 mm.

13. A device according to claim 1, in which the vault is mounted so as to be pivotable relative to the extrusion orifice about a rotation axis spaced from the axis of rotation of the roller, to expose the chamber.

14. A device according to claim 1, comprising a second inlet orifice for a rubber mix identical to or different from the first one located inside the plasticization chamber.

15. A device according to claim 8, comprising a plurality of orifices for the passage of threads inside the alveolus in the plate.

16. In an extruder having at least one extrusion screw for supplying a rubber mix to be formed into a product and an extrusion die including a device having an inlet orifice disposed at the outlet end of the at least one extrusion screw carried by the extruder, the device comprising:
   a drivable rotary roller having an external surface and an axis of rotation;
   a vault partially circumferentially covering the external surface of the roller and having an internal surface facing the external surface of the roller and forming an air gap therebetween, the internal surface of the vault carrying a plurality of projecting threads which delimit with the external surface of the roller a zone forming a chamber for plasticization of the rubber mix, at least two of the threads extending axially of the roller;
   an inlet orifice for introducing the rubber mix into the air gap between the roller and the vault; and
   an extrusion orifice spaced circumferentially from the inlet orifice, the extrusion orifice defining the profile of the product, the extrusion orifice formed by and between the roller's external surface and a wall facing the roller's external surface;
   the internal surface of the vault only partially circumscribing the external surface of the roller and not extending circumferentially past the extrusion orifice.

17. An appliance for extruding several rubber mixes comprising at least two extrusion devices disposed successively in the direction of rotation of a drum to allow the successive deposition on the drum of several products consecutively, each of the devices comprising
   a drivable rotary roller having an external surface and an axis of rotation;
   a vault partially circumferentially covering the external surface of the roller and having an internal surface facing the external surface of the roller and forming an air gap therebetween, the internal surface of the vault carrying a plurality of projecting threads which delimit with the external surface of the roller a zone forming a chamber for plasticization of the rubber mix, at least two of the threads extending axially of the roller;
   an inlet orifice for introducing the rubber mix into the air gap between the roller and the vault; and
   an extrusion orifice spaced circumferentially from the inlet orifice, the extrusion orifice defining the profile of the product, the extrusion orifice formed by and between the roller's external surface and a wall radially facing the roller's external surface;
   the internal surface of the vault only partially circumscribing the external surface of the roller and not extending circumferentially past the extrusion orifice.

18. An appliance for doubling two profiled products which comprises at least two extrusion devices having respective extrusion orifices, the two devices being disposed facing each other so that the profiled product issuing from one of the devices contacts and is doubled with the other product directly at the discharge from the respective extrusion orifices, each said device comprising;
   a drivable rotary roller having an external surface and an axis of rotation;
   a vault partially circumferentially covering the external surface of the roller and having an internal surface facing the external surface of the roller and forming an air gap therebetween, the internal surface of the vault carrying a plurality of projecting threads which delimit with the external surface of the roller a zone forming a chamber for plasticization of the rubber mix, at least two of the threads extending axially of the roller;
   an inlet orifice for introducing the rubber mix into the air gap between the roller and the vault; and
   an extrusion orifice spaced circumferentially from the inlet orifice, the extrusion orifice defining the profile of the product, the extrusion orifice formed by and between the roller's external surface and a wall facing the roller's external surface;
   the internal surface of the vault only partially circumscribing the external surface of the roller and extending circumferentially past the extrusion orifice.

19. An extrusion appliance including a calendar, at the discharge from which there is disposed an extrusion device comprising:
   a drivable rotary roller having an external surface and an axis of rotation;
   a vault partially circumferentially covering the external surface of the roller and having an internal surface facing the external surface of the roller and forming an air gap therebetween, the internal surface of the vault carrying a plurality of projecting threads which delimit with the external surface of the roller a zone forming a chamber for plasticization of the rubber mix, at least two of the threads extending axially of the roller;
   an inlet orifice for introducing the rubber mix into the air gap between the roller and the vault; and
   an extrusion orifice spaced circumferentially from the inlet orifice, the extrusion orifice defining the profile of the product, the extrusion orifice formed by and between the roller's external surface and a wall radially facing the roller's external surface;
   the internal surface of the vault only partially circumscribing the external surface of the roller and not extending circumferentially past the extrusion orifice.

20. A device according to claim 1 wherein the inlet orifice is located generally diametrically opposite the extrusion orifice.

21. A device according to claim 1 wherein the extrusion orifice is aligned with an outlet of the plasticization chamber in a direction oriented generally tangentially with respect to the roller's external surface.

* * * * *